(12) United States Patent
Yuasa et al.

(10) Patent No.: US 7,271,522 B2
(45) Date of Patent: Sep. 18, 2007

(54) DRIVING DEVICE AND DRIVING METHOD

(75) Inventors: Tomoyuki Yuasa, Sakai (JP); Yasuhiro Okamoto, Tondabayashi (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 11/353,691

(22) Filed: Feb. 14, 2006

(65) Prior Publication Data

US 2006/0186758 A1    Aug. 24, 2006

(30) Foreign Application Priority Data

Feb. 18, 2005  (JP) ............................ 2005-041540
Jan. 13, 2006  (JP) ............................ 2006-006395

(51) Int. Cl.
*H01L 41/09* (2006.01)
(52) U.S. Cl. ................................. 310/317; 310/323.02
(58) Field of Classification Search ................ 310/317, 310/323.02
See application file for complete search history.

(56) References Cited

U.S. PATENT DOCUMENTS

| | | | | |
|---|---|---|---|---|
| 5,589,723 A * | 12/1996 | Yoshida et al. | ............. | 310/328 |
| 5,917,267 A * | 6/1999 | Miyazawa et al. | ........... | 310/317 |
| 6,016,231 A * | 1/2000 | Kanbara et al. | ............. | 359/824 |
| 6,232,697 B1 * | 5/2001 | Mizumoto | ................... | 310/317 |
| 6,249,093 B1 * | 6/2001 | Takahata et al. | ............ | 318/129 |
| 6,320,298 B1 * | 11/2001 | Kawabe | ....................... | 310/317 |
| 6,483,226 B1 * | 11/2002 | Okada | ......................... | 310/328 |
| 6,512,321 B2 * | 1/2003 | Yoshida et al. | ........ | 310/316.01 |
| 6,703,762 B1 * | 3/2004 | Okada | ......................... | 310/317 |
| 6,717,329 B2 * | 4/2004 | Yoshida et al. | ........ | 310/316.02 |
| 6,727,635 B2 * | 4/2004 | Okamoto et al. | ...... | 310/316.01 |
| 6,876,126 B2 * | 4/2005 | Okada | ......................... | 310/317 |
| 7,193,351 B2 * | 3/2007 | Yoshida | ...................... | 310/317 |

FOREIGN PATENT DOCUMENTS

| | | |
|---|---|---|
| JP | 11-98865 (A) | 8/1989 |
| JP | 09-191676 (A) | 7/1997 |
| WO | WO/2006/017399 | * 2/2006 |

* cited by examiner

*Primary Examiner*—Thomas M. Dougherty
(74) *Attorney, Agent, or Firm*—Sidley Austin LLP

(57) ABSTRACT

A driving device of the disclosure has an electromechanical transducer that extends and contracts upon application of voltage thereto and a support member that slidably supports a movable body and is displaced with the electromechanical transducer to which the support member is connected. The disclosed device includes a drive circuit that applies the voltage to the electromechanical transducer is such that the voltage which increases or decreases from a first voltage to a last voltage in a stepped manner and in which at least three values sequentially circulate. A period of time for which the first voltage is applied is changeable. By this method, the movable body is moved with respect to the support member by making a difference between an extension velocity and a contraction velocity.

15 Claims, 10 Drawing Sheets

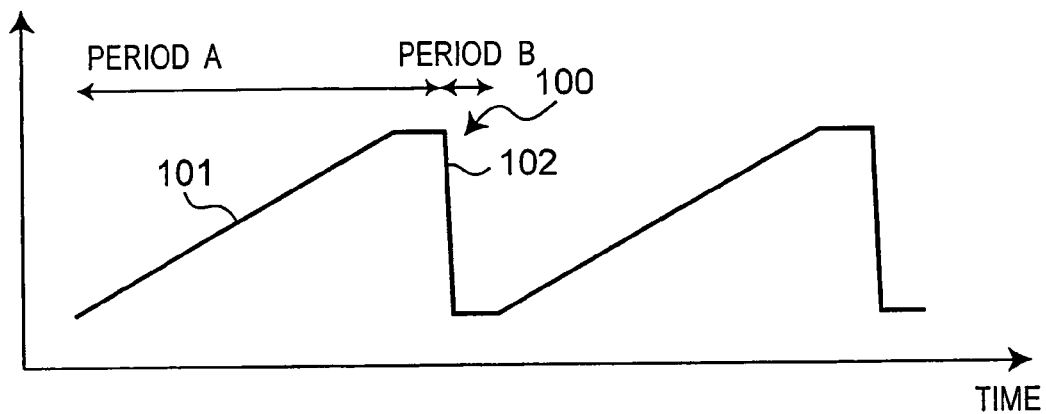
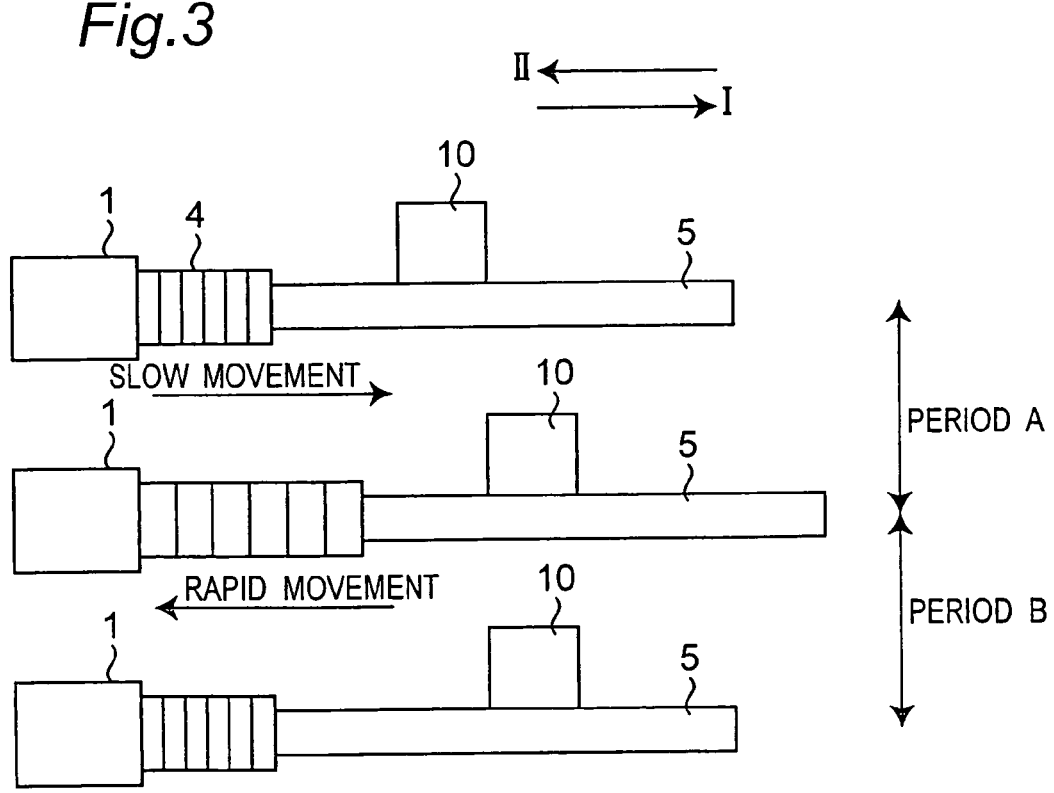

*Fig.4A*
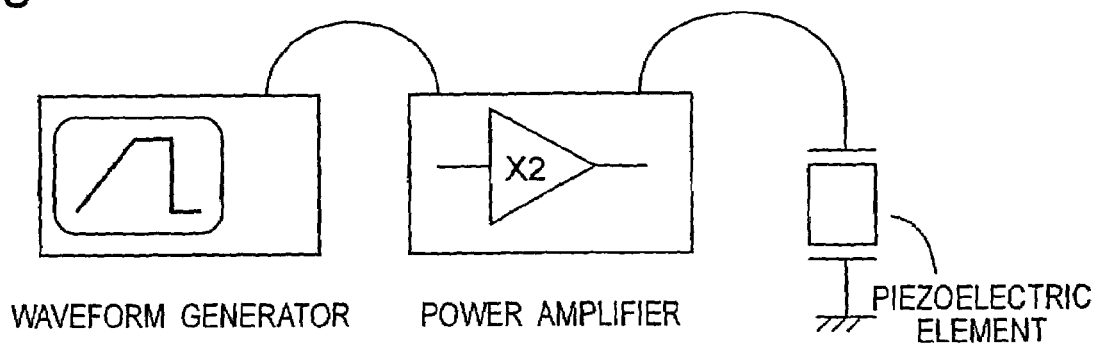
WAVEFORM GENERATOR    POWER AMPLIFIER    PIEZOELECTRIC ELEMENT
*Fig.4B* THRUST WAVEFORM 
*Fig.4C* RETURN WAVEFORM 

DRIVING DEVICE AND DRIVING METHOD

RELATED APPLICATION

This application is based on Japanese Patent Applications No. 2005-41540 and 2006-6395, the contents of which are incorporated herein by reference.

BACKGROUND OF THE INVENTION

The present invention relates to a driving device and more particularly relates to a driving device and a driving method in which electromechanical transducers such as piezoelectric elements (e.g., so called "piezo elements") are utilized. The driving device of the invention is suitable, for example, as a driving system for optical components in a camera, DVD equipment, MD equipment, an endoscope and the like and a driving system for a precision stage.

As a driving device utilizing electromechanical transducers such as piezoelectric elements of which lengths are changed (extended and contracted) with application of voltage, for example, there has been known a driving device shown in an exploded perspective view of FIG. 1A and an assembly perspective view of FIG. 1B (see JP 11-98865 A).

The driving device, in which a movable body 10 can be moved relative to a base 1, can be used as a lens driving device for a camera, for example. That is, connection of the movable body 10 to a lens frame makes it possible to move a lens with the movable body 10.

A piezoelectric element 4 is composed of a large number of piezoelectric plates that are stacked. One end 4a of the piezoelectric element 4 with respect to a direction of the extension is fixed to the base 1, and the other end 4b is fixed to a first end 5a of a rod (a support member) 5. The rod 5 is slidably supported by support parts 2 and 3 that are formed integrally with the base 1.

The rod 5 is clipped by a main body 11 and a cap 12, a biasing force in the clipping direction is applied to the main body 11 and the cap 12 by a pressure spring (biasing member) 13, and thus the movable body 10 is engaged with periphery of the rod 5 by a frictional force. That is, the movable body 10 is supported by the rod 5 so as to be capable of sliding to the rod 5 by action of a force which overcomes the frictional force.

To the piezoelectric element 4 is connected a voltage control circuit not shown. When specified drive voltage having a sawtooth waveform is applied to the piezoelectric element 4, the piezoelectric element 4 vibrates with sawtooth displacement having generally the same form (see FIG. 2). Concomitantly, the rod 5 vibrates with the sawtooth displacement in a direction of a length thereof. A graph of FIG. 2 shows the vibration displacement of the piezoelectric element 4 and shows the vibration displacement of the rod 5.

In a mildly rising slant section 101 in a period A of a first waveform 100, specifically, the piezoelectric element 4 elongates comparatively slowly and the rod 5 moves slowly in a direction of an arrow I in FIG. 1B. In a period B, whereas, in a waveform part shown in a falling slant section 102, the piezoelectric element 4 rapidly contracts to an initial length and the rod 5 moves rapidly in a direction of an arrow II.

The same movement is thereafter repeated and, consequently, the rod 5 vibrates with repetition of the slow movement in the direction I and the rapid movement in the direction II. Thus the rod 5 vibrates while drawing such sawtoothed vibration waveform having slow parts and fast parts as shown in FIG. 2.

In the driving device, a spring force (i.e., a friction force of the movable body 10 with respect to the rod 5) of the pressure spring 13 of the movable body 10 is adjusted so that the movable body 10 moves with the rod 5 by the frictional force against the rod 5 when the rod 5 slowly moves and so that the movable body 10 stays through inertial force which overcomes the frictional force against the rod 5 when the rod 5 rapidly moves, as shown in FIG. 3. As a result, the movable body 10 moves in the direction 1 relative to the base 1 while the rod 5 vibrates.

In order to move the movable body 10 in the direction of the arrow II in FIG. 1B, the vibration waveform of the piezoelectric element 4 and the rod 5 shown in FIG. 2 has only to be reversed. That is, the wave form has only to have steep rising parts and gently sloped falling parts. A principle of the movement of the movable body 10 is the same as the above.

As described above, the drive voltage having the sawtoothed waveform is required to be applied to the piezoelectric element. As a method of producing such drive voltage, there has been known a method that will be described below.

<<Method Using Waveform Generator and Amplifier (see FIG. 4)>>

Sawtoothed waveform of 8 bits and 0-5 V is produced by D/A conversion performed by the waveform generator and is amplified to 0-10 V with use of a power amplifier (see FIG. 4A). Thus the sawtoothed waveform of 0-10 V for driving is obtained.

FIG. 4B shows waveform of drive voltage on occasion of a thrust of the movable body 10 in the direction I in FIG. 3, and FIG. 4C shows waveform of drive voltage on occasion of a drive in the opposite direction.

<<Method Using Constant-Current Circuit and Switching Circuit (See FIG. 5)>>

In a digital circuit shown in FIG. 5A, sections A and D configure constant-current circuits and sections B and C configure switching circuits. For the digital circuit, a signal shown in FIG. 5B is applied to terminals (a) through (d). Thus the sawtoothed waveform of 0-10 V for driving is obtained by alternate operation of the constant-current circuits A, D and the switching circuits B, C.

Both the methods described with reference to FIG. 4 and FIG. 5 are disclosed in JP 09-191676 A.

As described above, use of the waveform generator and the amplifier, use of the constant-current circuits and the switching means, and the like have conventionally been required for the obtainment of the sawtoothed drive voltage waveform. Such requirement leads to complicated configurations and cost increase.

SUMMARY OF THE INVENTION

An object of the present invention is to provide a driving device in which electromechanical transducers are utilized and which has a drive circuit capable of producing drive voltage having sawtoothed waveform with use of a simple circuit configuration.

Another object of the invention is to provide a driving device in which electromechanical transducers are utilized and which has a drive circuit for producing drive voltage that is capable of reducing noise on occasion of start and stop of a movable body.

In order to achieve the objects, a driving device of the invention has:

an electromechanical transducer that extends and contracts upon application of voltage thereto, a support member that slidably supports a movable body and is displaced with the electromechanical transducer to which the support member is connected, and a drive circuit that applies the voltage to the electromechanical transducer, wherein applied to the electromechanical transducer by the drive circuit is the voltage which increases or decreases from a first voltage to a last voltage in a stepped manner and in which at least three values sequentially circulates, the movable body is relatively moved with respect to the support member by making a difference between an extension velocity and a contraction velocity when the electromechanical transducer extends and contracts upon application of the voltage thereto, and a period of time for which the first voltage is applied is changeable.

A driving method of the invention is a method of driving a movable body in a driving device having:

an electromechanical transducer that extends and contracts upon application of voltage thereto, a support member that is in the form of a rod, that one end of which is fixed to one end in extension and contraction directions of the electromechanical transducer and that slidably supports a movable body, a biasing member that biases the movable body toward the support member, and a drive circuit that includes an H-bridge circuit which has four switching elements and which applies the voltage to the electromechanical transducer and a control circuit which controls the switching elements, the driving method including the steps of:

applying from the driving circuit to the electromechanical transducer the voltage which increases or decreases from a first voltage to a last voltage in a stepped manner and in which at least three values sequentially circulates, repeating a state where the movable body is moved together with the support member through a frictional force to the support member and a state where the movable body slides along the support member through an action of a force which overcomes the frictional force to the support member by making a difference between an extension velocity and a contraction velocity when the electromechanical transducer extends and contracts upon application of the voltage thereto, and changing smoothly a period of time for which the first voltage on occasion of the start and/or the stop of the movable body.

In the driving device and the driving method of the invention, the drive circuit applies to the electromechanical transducer the voltage which increases or decreases in the stepped manner and in which at least three values circulates sequentially. Thus attained are easy control, simplified circuit configuration, and cost reduction.

Besides, the velocity increase on occasion of the start of the movable body and the velocity decrease on occasion of the stop thereof can be gradually achieved by the change in the period of time for which the first voltage is applied, and thus the noise on occasion of the start and the stop of the movable body can be reduced.

BRIEF DESCRIPTION OF THE DRAWINGS

The present invention will be further described with reference to the accompanying drawings wherein like reference numerals refer to like parts in the several views, and wherein:

FIG. 2 is a diagram for illustrating a principle of driving in the driving device of FIG. 1;

FIG. 3 is a diagram for illustrating the principle of driving in the driving device of FIG. 1;

FIGS. 4A to 4C are diagrams for illustrating a conventional method of producing sawtoothed drive voltage;

DETAILED DESCRIPTION OF THE PREFERRED EMBODIMENTS

<<Circuit Configuration (FIG. 6, FIG. 7)>>

Figure 6:
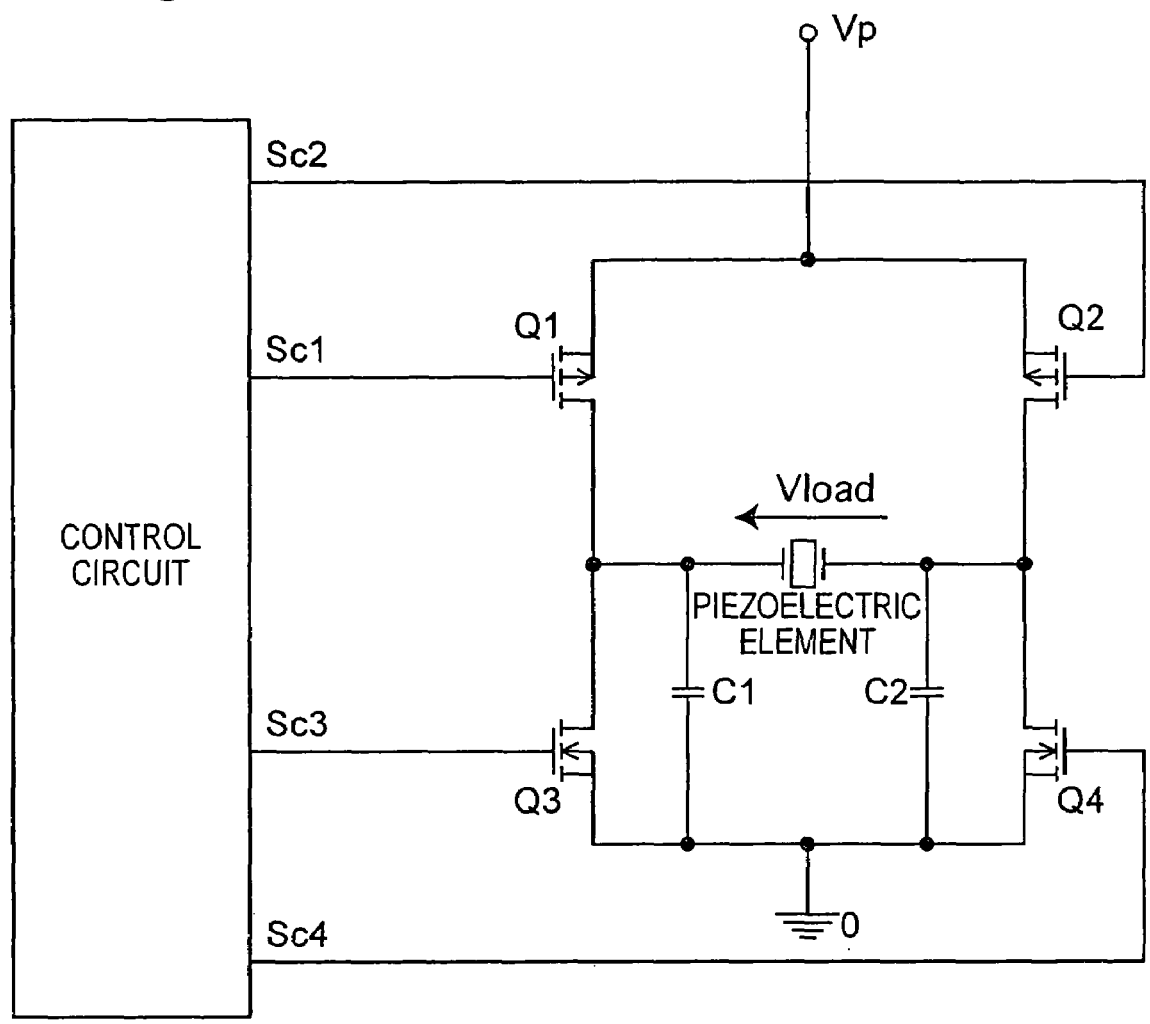
FIG. 6 is a circuit diagram showing an example of a drive circuit of the invention.

FIG. 6 shows a configuration of a drive circuit for applying voltage to a piezoelectric element in a driving device of one embodiment of the invention. In the driving device of the embodiment, a configuration of mechanism part is the same as that of such a conventional example as shown in FIG. 1A but the configuration of the drive circuit is different from conventional configurations.

Figure 1A:
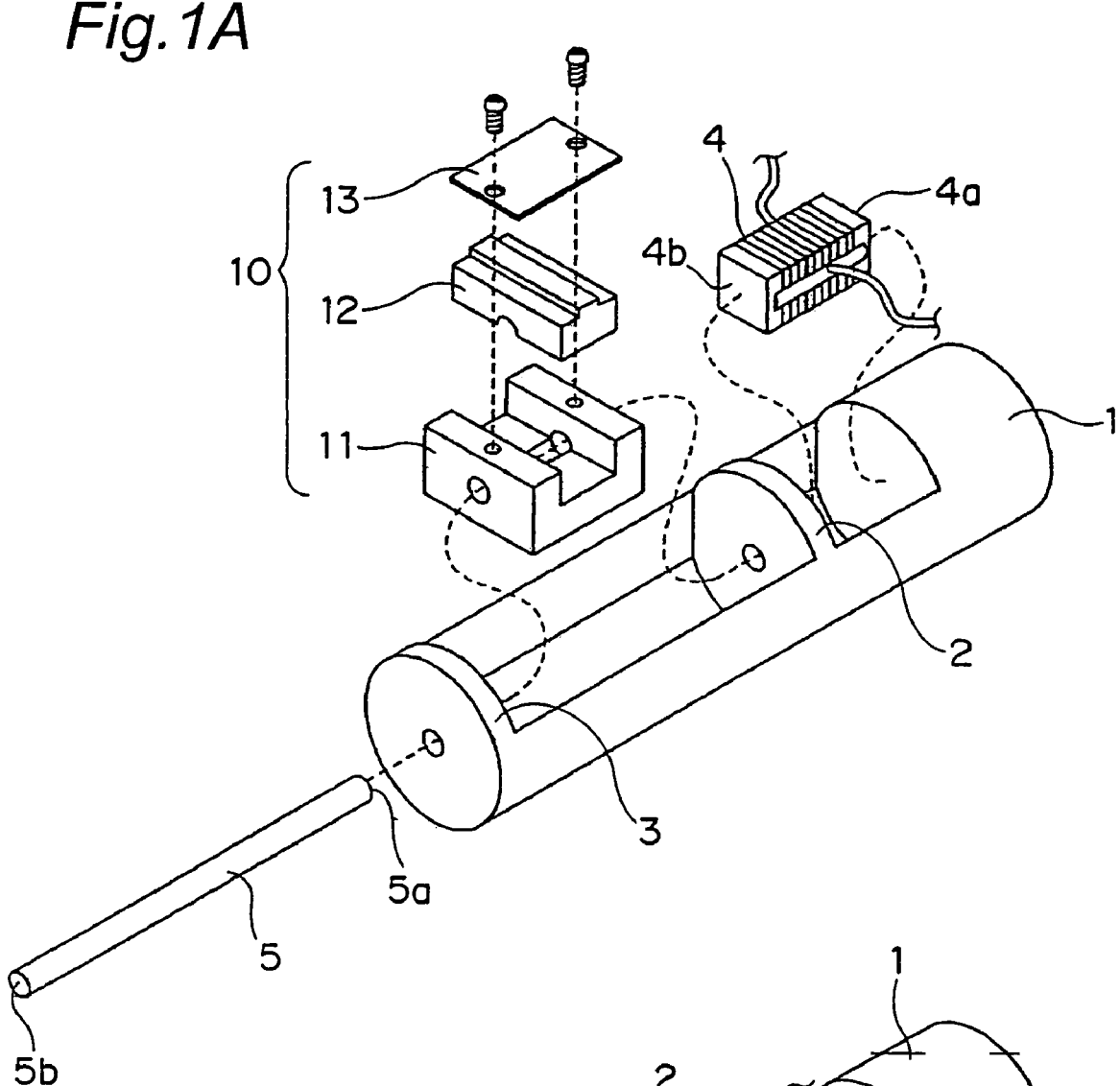
FIGS. 1A and 1B are an exploded perspective view and an assembly view showing a conventional driving device.

In the embodiment shown in the drawing, that is, the piezoelectric element 4 of FIG. 1A is driven with use of the drive circuit of FIG. 6.

In FIG. 6, an H-bridge circuit is composed of four switches Q1 through Q4, two capacitors C1, C2, and a piezoelectric element. The switches Q1, Q2 are composed of MOSFETs of P-channel type, and the switches Q3, Q4 are composed of MOSFETs of N-channel type.

In the switch Q1, a source is connected to a terminal Vp, and a gate is connected to a terminal Sc1 of a control circuit.

In the switch Q2, a source is connected to the terminal Vp, and a gate is connected to a terminal Sc2 of the control circuit.

In the switch Q3, a drain is connected to a drain side of the switch Q1, and a source is grounded. A gate of the switch Q3 is connected to a terminal Sc3 of the control circuit.

In the switch Q4, a drain is connected to a drain side of the switch Q2, and a source is grounded. A gate of the switch Q4 is connected to a terminal Sc4 of the control circuit.

One end of the piezoelectric element is connected to between the drains of the switches Q1 and Q3, and the other end is connected to between the drains of the switches Q2 and Q4.

As shown in the drawing, the capacitors C1, C2 are connected in parallel with the switches Q3, Q4, respectively. Both the capacitors C1, C2 have a capacity as large as a capacity of the piezoelectric element.

Figure 7:
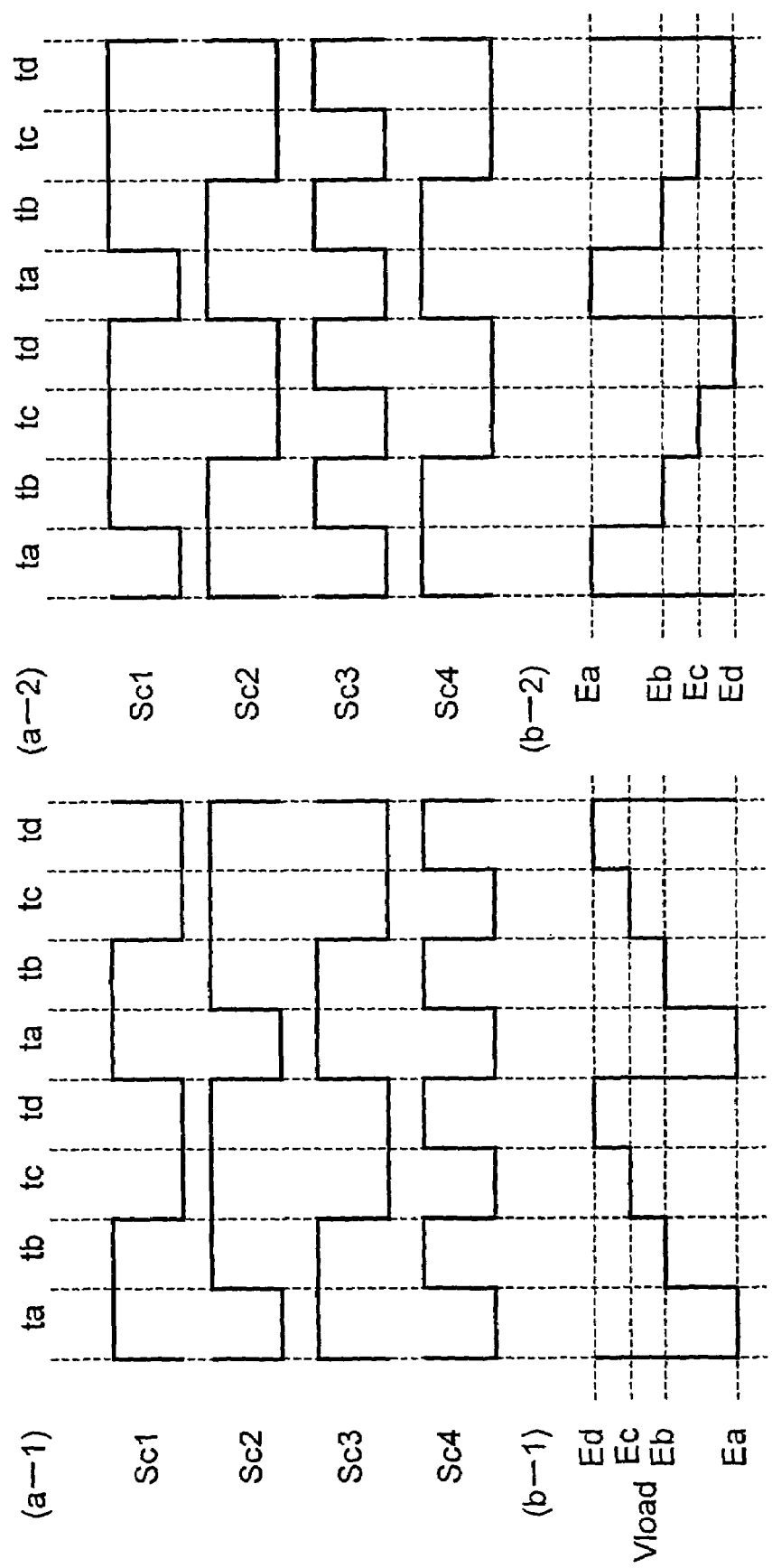
FIG. 7 is a diagram showing control signals for the control circuit of FIG. 6 and voltages that are applied to a piezoelectric element.

When gate voltages of the switches Q1 through Q4 are controlled by signals from the control circuit as shown in a part (a-1) of FIG. 7, in the drive circuit of FIG. 6, four drive voltages (first voltage Ea, second voltage Eb, third voltage Ec, last voltage Ed) loaded on the piezoelectric element have a step-like waveform as shown in a part (b-1) of FIG. 7. As seen from the drawing, reference characters ta through td denote voltage application time, and the time ta through td defines one cycle. In the control circuit, the application time ta, tb, tc, td for the voltage values Ea, Eb, Ec, Ed can be altered by change in timing when the signals are outputted to the terminals Sc1, Sc2, Sc3, Sc4, respectively.

In the section ta, the switches Q2, Q3 are turned on and the switches Q1, Q4 are turned off. In the section td, the switches Q1, Q4 are turned on and the switches Q2, Q3 are turned off. Accordingly, voltages loaded on the piezoelectric element in the section ta and the section td have an equal absolute value but inverse signs. When a voltage of 3 volts is applied to the terminal Vp, for example, the drive voltage Ea of −3V applied to the piezoelectric element results in the drive voltage Ed of +3V.

In the section tb, the switches Q1, Q2 are turned off and the switches Q3, Q4 are turned on. As a result, both ends of the piezoelectric element are short-circuited and grounded, and thus the drive voltage Eb becomes zero.

In the section tc, an expression Ec=0.5Ed=+1.5V holds because only the switch Q1 is turned on and because the piezoelectric element and the two capacitors C1, C2 are equal in capacity.

With repetition of the cycle ta through td, as shown in the part (b-1) of FIG. 7, the step-like drive voltages in which the four voltage values Ea, Eb, Ec, Ed sequentially circulate are cyclically applied to the piezoelectric element. In this case, the first voltage Ea has a minimal value among the drive voltages.

Parts (a-2) and 7(b-2) of FIG. 7 show gate voltages and corresponding drive voltages on occasion of driving the movable body 10 in a direction opposite to the above. In this case, the first voltage Ea has a maximal value among the drive voltages.

<<Drive Waveform (FIG. 8, FIG. 9)>>

Figure 8:
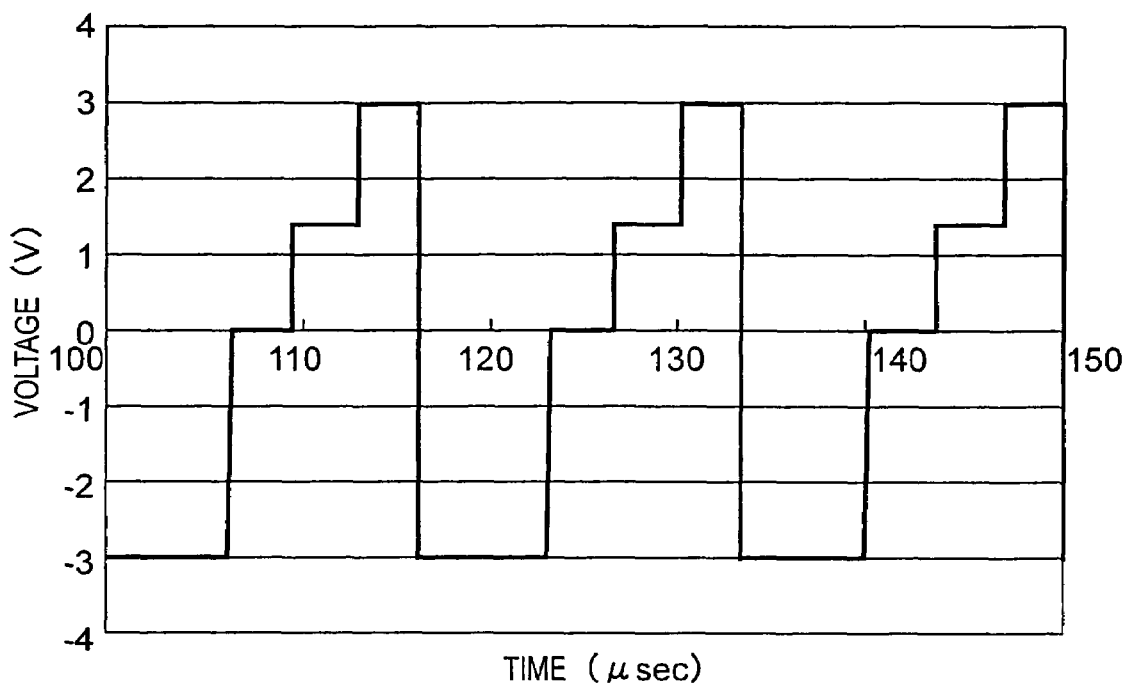
FIG. 8 is a diagram showing an example of waveform of drive voltages that are applied from the drive circuit of FIG. 6 to the piezoelectric element.

FIG. 8 is a graph showing drive voltages with application time in the part (a-1) of FIG. 7 set under conditions ta=1.0T and tb=tc=td=0.5T.

Figure 1B:
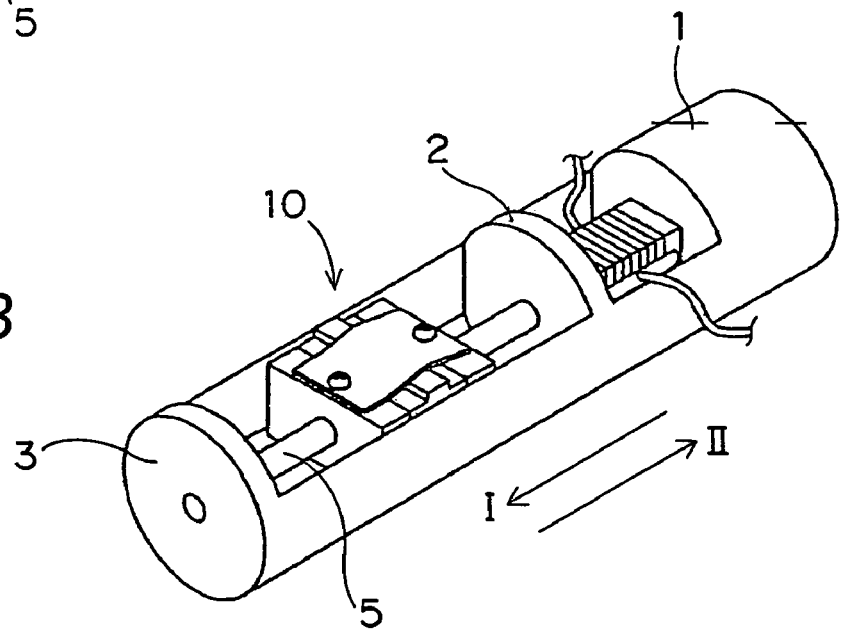
Figure 5A:
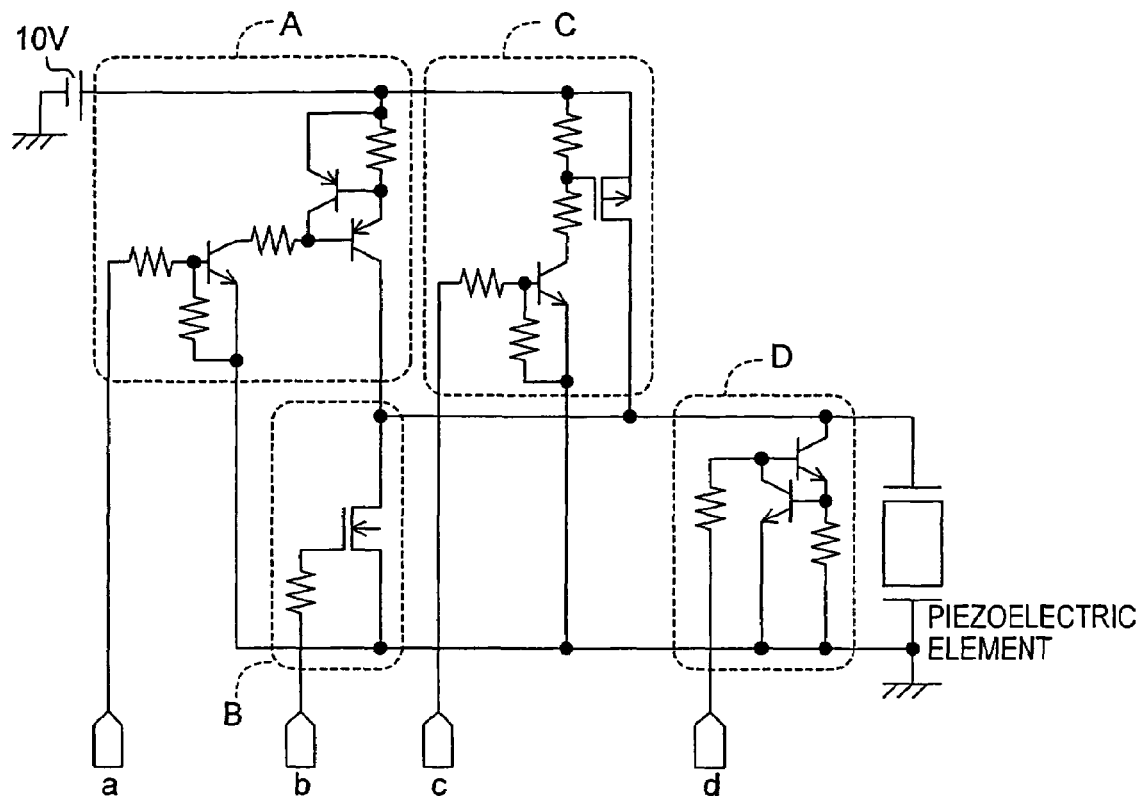
FIGS. 5A and 5B are diagrams for illustrating a conventional method of producing sawtoothed drive voltage.
Figure 5B:
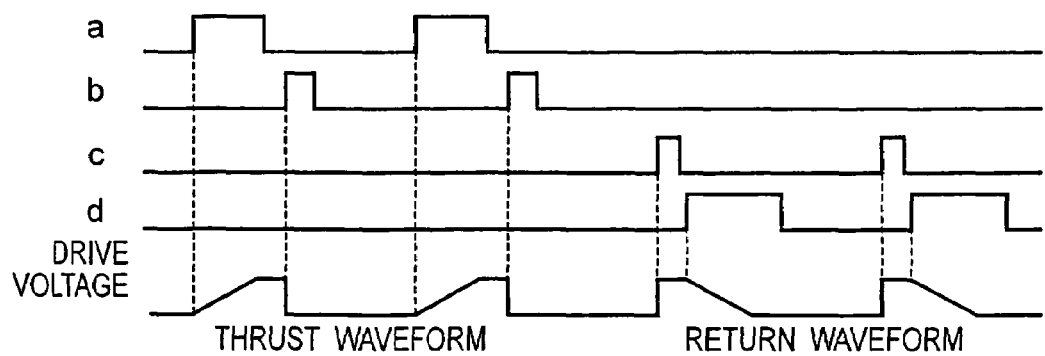

Herein, character T represents a resonance period of a physical system of the mechanism part (the electromechanical transducer and the rod) shown in FIG. 1. On condition that a resonance frequency 1/T of the mechanism part is set at 150 kHz, for example, an expression T=1/150000=6.66 µsec holds. That is, expressions ta=1.0T=6.66 µsec and tb=tc=td=0.5T=3.33 µsec hold.

Figure 9:
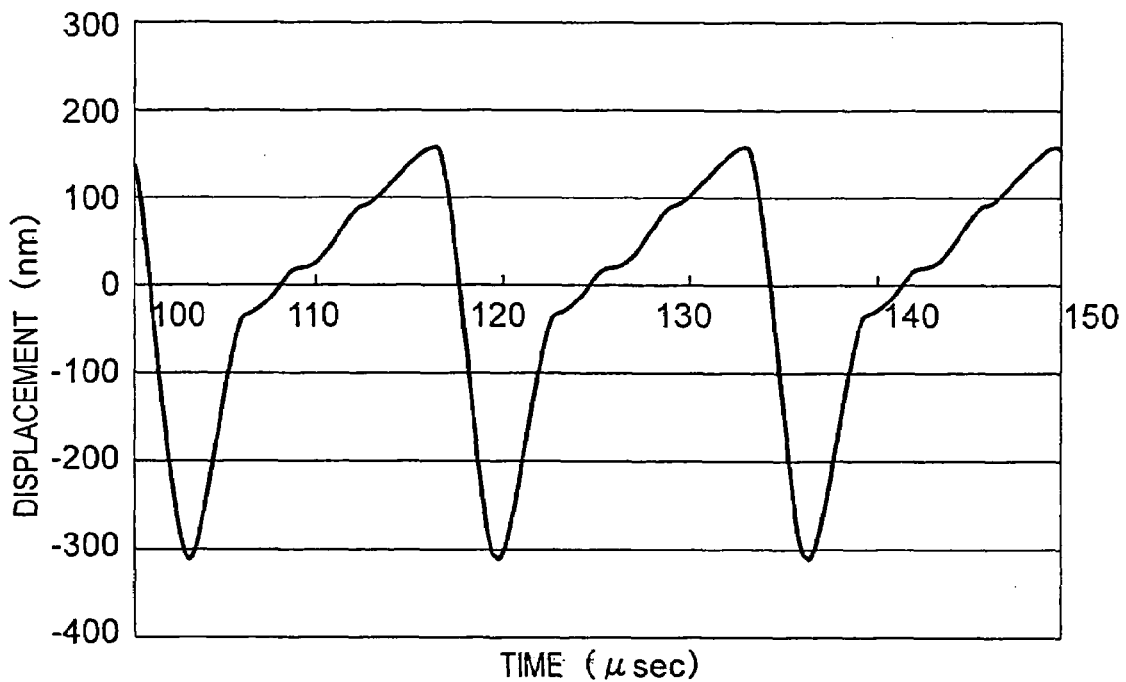
FIG. 9 is a graph showing displacements of a rod that are caused by application of the drive voltages of FIG. 8.

FIG. 9 shows displacements of the rod that are caused by application of the drive voltages of FIG. 8. There are obtained sawtoothed vibration displacements of the rod that generally correspond to the step-like waveform of FIG. 8.

In the embodiment, as evident from the above, a single voltage with a constant value is applied in each section, and the rod vibration displacements with the sawtoothed waveform are obtained as a result of only sequential change in value of such constant voltage.

In the invention, a specific configuration of the circuit, switching elements used therein, and the like are not limited to those shown in FIG. 6 because it is essential only that such a step-like fluctuating waveform as shown in FIG. 8 is obtained as the drive voltage for the piezoelectric element.

Though the step-like fluctuating waveform in which the four voltage values sequentially circulate is used in the example shown in the drawing, five or more voltage values may be used. Still, use of four voltage values or three voltage values that will be described later is preferable in that appropriate rod vibration displacements can be attained with a simple circuit configuration.

<<Measurement of Thrust by Experiment>>

Thrusts caused by the drive with use of the drive circuit were measured by experiment with a set of application time varied. The measurement data was obtained from measurement of driving forces of the movable body 10 in FIG. 1 with use of a load cell.

Figure 10:
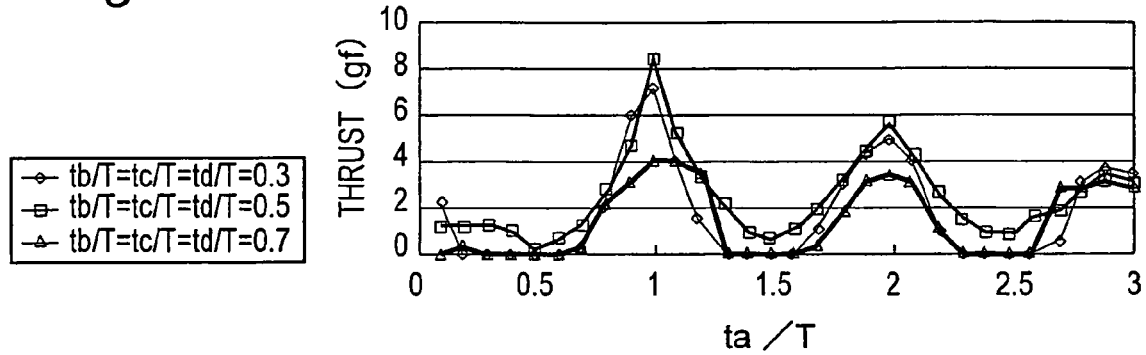
FIG. 10 is a graph showing change in thrust on condition that application time for the drive voltages is changed in various manners.

A graph of FIG. 10 shows data with conditions that only ta was changed with tb, tc, td held equally at a constant value. Herein, T=6.66 µsec holds.

In FIG. 10, the measurement was carried out with change in ta under three conditions of tb/T=tc/T=td/T=0.3, tb/T=tc/T=td/T=0.5, and tb/T=tc/T=td/T=0.7. The following is found from the graph.

Peaks appear when ta/T is in vicinity of 1.0, 2.0, and 3.0 and, among those, the thrust is maximized when ta/T is 1.0. It is therefore thought that the movable body 10 has the largest traveling velocity when being driven with ta/T=1.0. When ta/T is 0.5 and 1.5, on the other hand, the thrust becomes zero or gets close to zero. It is therefore thought that the movable body 10 does not move or has a small traveling velocity, even if being moved, when the movable body 10 is driven with ta/T=0.5 or 1.5.

In the experiment concerning FIG. 10, the movable body 10 was moved in a driving direction (the direction of the arrow I in FIG. 3) corresponding to the parts (a-1) and (b-1) of FIG. 7. The reference character ta represents a period of time for which the first voltage Ea as the lowest voltage among the four voltage values (Ea, Eb, Ec, Ed, in increasing order) is applied.

When the movable body 10 is moved in the direction opposite to the above, on the other hand, the sawtoothed rod vibration waveform has only to be reversed left to right. Accordingly, a similar result is anticipated on condition that four voltage values Ea, Eb, Ec, Ed are set in decreasing order and that a period of time for application of the first voltage Ea as the highest voltage is set as "ta".

Figure 11:
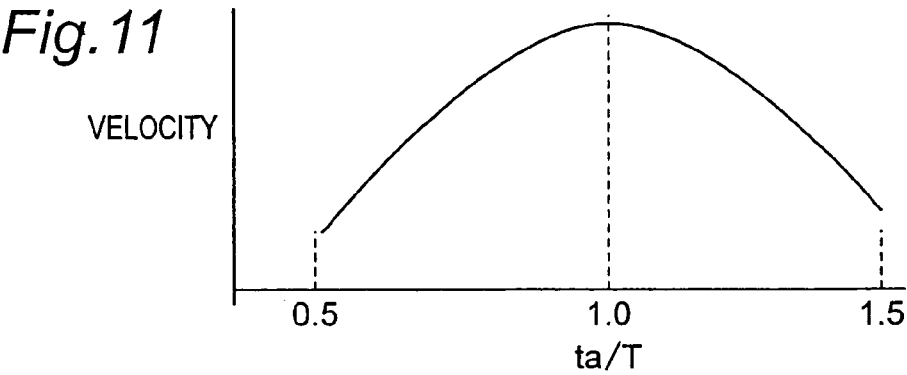
FIG. 11 is a graph showing a relation between value ta/T and velocity of a movable body.

In FIG. 11, a relation between the value ta/T described above and the traveling velocity of the movable body 10 is graphed schematically. As shown in the graph, the movable body 10 has the largest traveling velocity on a condition of ta/T=1.0, and has the smallest traveling velocity on a condition of ta/T=0.5 or 1.5.

Figure 12A:
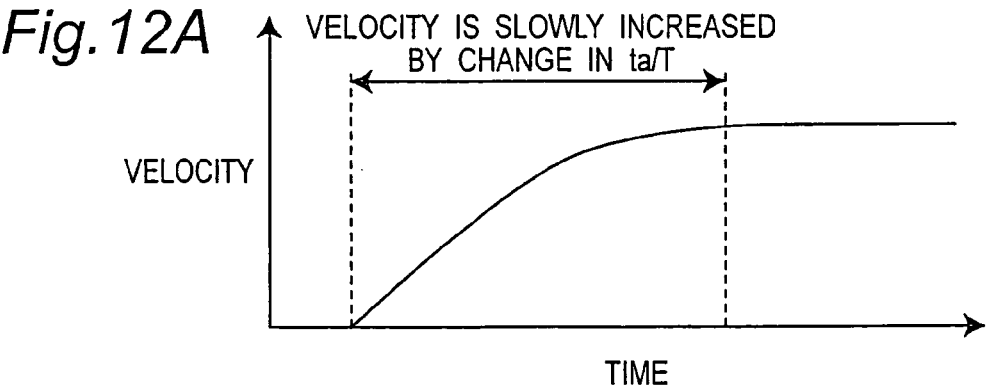
FIGS. 12A and 12B are graphs showing change in velocity of the movable body on occasion of start and stop of the movable body.
Figure 12B:
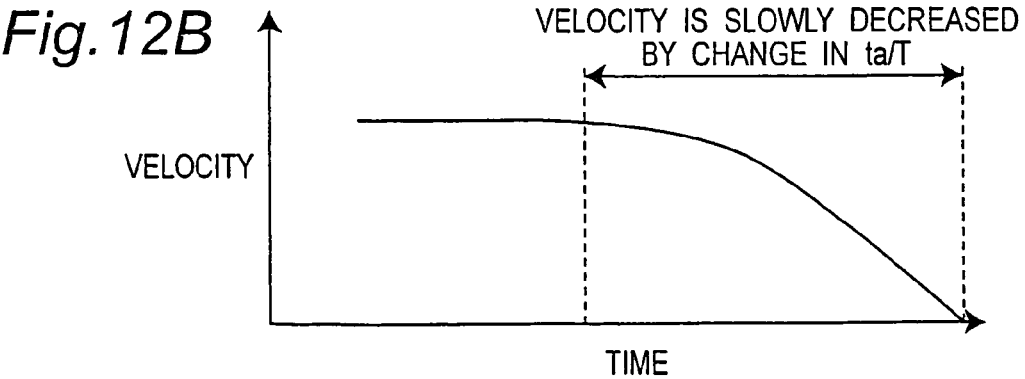

The driving device shown in FIG. 1 has a problem in that the drive at the largest traveling velocity throughout a period from start to stop of the movable body 10 greatly increases the velocity change on occasion of the start and the stop and thus makes a noise. In the driving device of the embodiment, therefore, the velocity is gradually increased from zero to the highest velocity when the movable body 10 is started, as shown in FIG. 12A, and the velocity is gradually decreased from the highest velocity to zero when the movable body 10 is stopped, as shown in FIG. 12B. For that purpose, the drive circuit smoothly changes ta/T from 0.5 to 1.0 or from 1.5 to 1.0 when the movable body 10 is started and smoothly changes ta/T from 1.0 to 0.5 or from 1.0 to 1.5 when the movable body 10 is stopped. Such change in ta/T can be achieved by gradual change in the application time ta for the first voltage Ea which change is caused by change in timing of signal output to the terminals Sc1, Sc2, Sc3, and Sc4 of the control circuit of the drive circuit, because the resonance frequency T of the system of the mechanical part is constant.

In the drive circuit of the embodiment, the traveling velocity of the movable body 10 on occasion of the start and the stop thus can be gradually changed by the change in the time ta for which the first voltage Ea as the maximum or minimum voltage is applied. As a result, the noise on occasion of the start and the stop of the movable body 10 can be reduced.

It is to be noted that the velocity of the movable body 10 can be also changed by the change of the time for which the driving voltage (e.g., the second voltage Eb) other than the first voltage Ea is applied. However, the velocity change of the movable body 10 on occasion of changing the application time of the first voltage Ea is greater in comparison with that on occasion of changing the other driving voltage. Though the velocity of the movable body 10 can be also changed by the change of value of the driving voltage, in this case a complication of the configuration of the driving circuit is brought. Accordingly, the method in which the application time is changed is advantageous as the method for changing the velocity of the movable body 10.

<<Modification>>

As for the embodiment, the driving device has been described that applies from the drive circuit to the piezoelectric element the drive voltages sequentially circulating among four voltage values. The invention, however, can be applied to a driving device that applies from a drive circuit shown in FIG. 13 to the piezoelectric element drive voltages sequentially circulating among three voltage values. In the drive circuit shown in FIG. 13, the two capacitors C1, C2 are omitted and the configuration of the circuit is further simplified in comparison with the drive circuit of the embodiment shown in FIG. 6.

Figure 13:
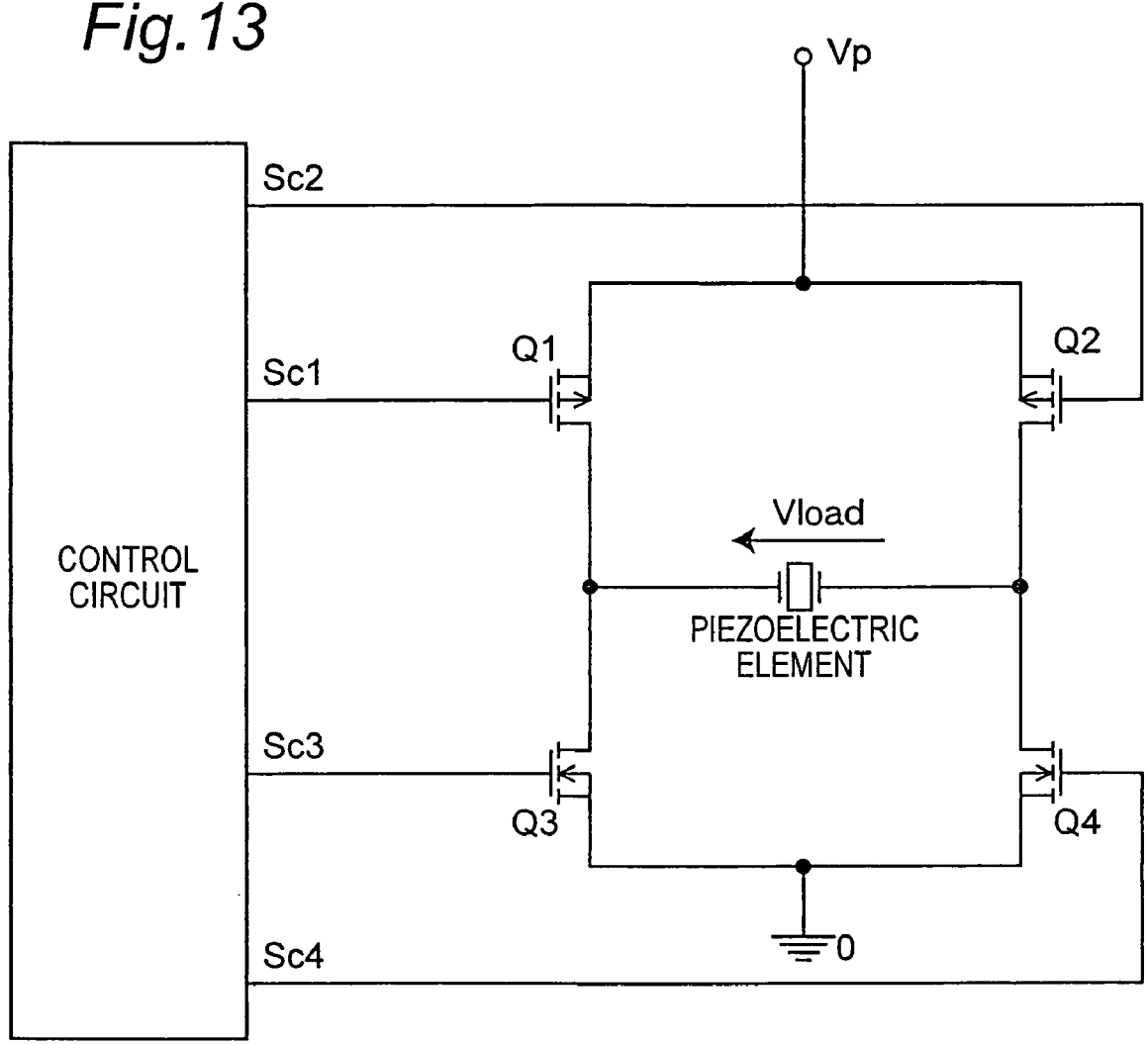
FIG. 13 is a circuit diagram of a drive circuit in a modification.
Figure 14:
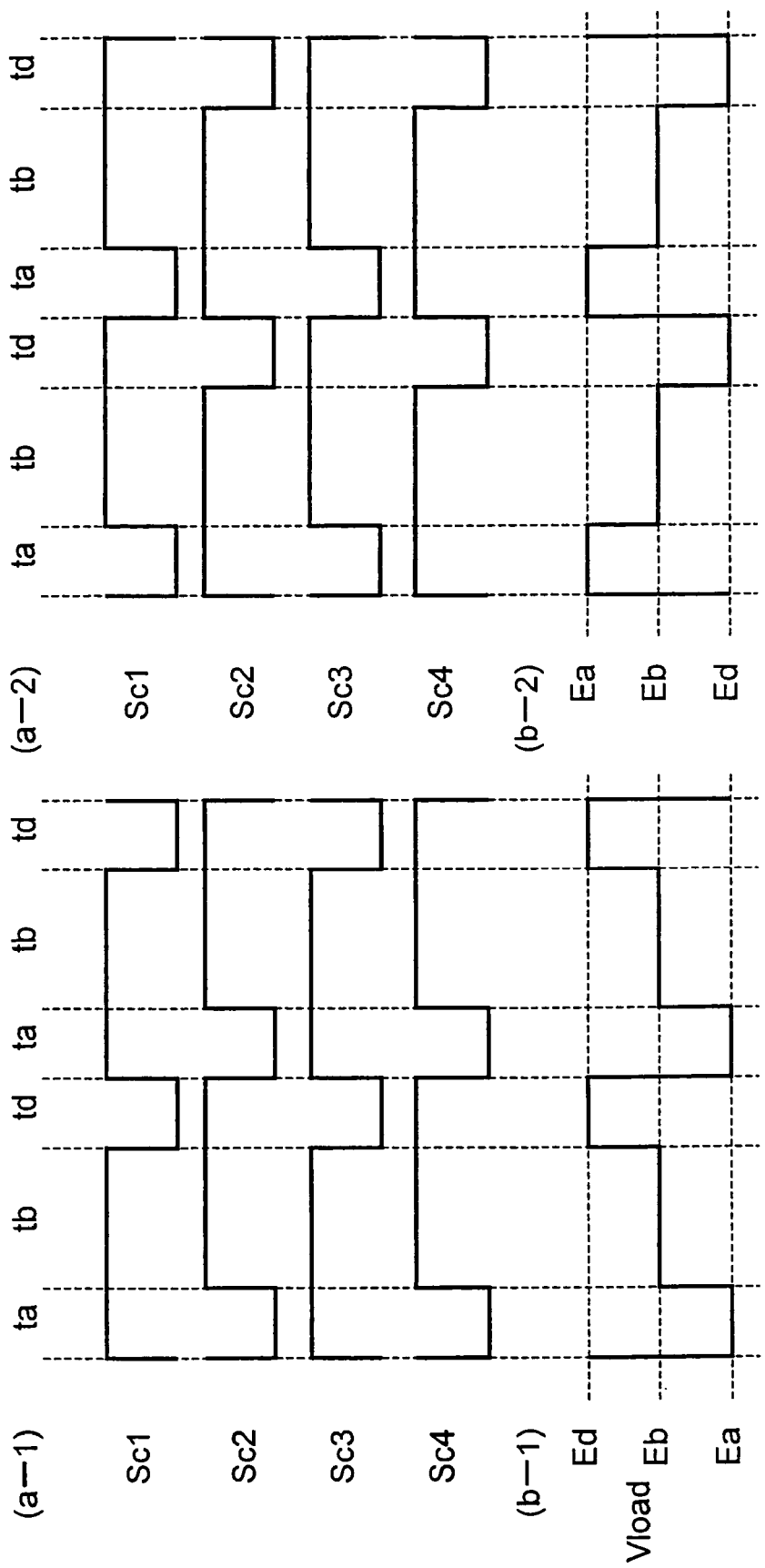
FIG. 14 is a diagrams showing control signals for the control circuit of FIG. 13 and voltages that are applied to a piezoelectric element.

When gate voltages of switches Q1 through Q4 are controlled as shown in a part (a-1) of FIG. 14 by signals from the control circuit, in the drive circuit of FIG. 13, drive voltages (first voltage Ea, second voltage Eb, last voltage Ed) loaded on the piezoelectric element have a step-like waveform as shown in a part (b-1) of FIG. 14. As seen from the drawing, reference characters ta, tb, td denote application time for the voltages, and the time ta, tb, td defines one cycle. The application time ta, tb, td for the voltage values Ea, Eb, Ed can be altered by change in timing when the signals are outputted to terminals Sc1, Sc2, Sc3, and Sc4, respectively, in the control circuit.

In the section ta, the switches Q2, Q3 are turned on and the switches Q1, Q4 are turned off. In the section td, the switches Q1, Q4 are turned on and the switches Q2, Q3 are turned off. Accordingly, voltages loaded on the piezoelectric element in the section ta and the section td have an equal absolute value but inverse signs. When a voltage of 3 volts is applied to the terminal Vp, for example, the drive voltage Ea of −3V applied to the piezoelectric element results in the drive voltage Ed of +3V.

In the section tb, both the switches Q1, Q2 are turned off and the switches Q3, Q4 are turned on. As a result, both ends of the piezoelectric element are short-circuited and grounded, and thus the drive voltage Eb becomes zero.

With repetition of the cycle of ta, tb, td, as shown in the part (b-1) of FIG. 14, the step-like drive voltages in which the three voltage values Ea, Eb, Ed sequentially circulate are cyclically applied to the piezoelectric element. In this case, the first voltage Ea has a minimal value among the drive voltages.

Parts (a-2) and 14(b-2) of FIG. 14 show gate voltages and corresponding drive voltages on occasion of driving the movable body 10 in a direction opposite to the above. In this case, the first voltage Ea has a maximal value among the drive voltages.

In the drive circuit of FIG. 13, the value ta/T is smoothly changed from 0.5 to 1.0 or from 1.5 to 1.0 when the movable body 10 is started, and the value ta/T is smoothly changed from 1.0 to 0.5 or from 1.0 to 1.5 when the movable body 10 is stopped. Such changes in ta/T can be achieved by gradual change in the application time ta for the voltage value Ea which change is caused by change in timing of signal output to the terminals Sc1, Sc2, Sc3, and Sc4 of the control circuit of the drive circuit, because the resonance frequency T of the system of the mechanical part is constant.

In the drive circuit of FIG. 13, the traveling velocity of the movable body 10 on occasion of the start and the stop thus can be changed and decreased by the change in the time ta for which the first voltage Ea as the maximum or minimum voltage is applied. As a result, the noise on occasion of the start and the stop of the movable body 10 can be reduced.

It is to be noted that the velocity change of the movable body 10 can become larger by changing the value ta/T through a whole section between 0.5 and 1.0, or between 1.5 and 1.0, and however the value ta/T may be changed within a partial section between 0.5 and 1.0, or between 1.5 and 1.0 in the case that the small change of velocity of the movable body 10 is permitted. The value ta/T may be changed within a section between 0.6 and 0.9, or between 1.4 and 1.1, for example.

The movable body 10 can be most effectively moved relative to the rod 5 when the slow motion of the rod 5 results in moving the movable body 10 together with the rod 5, whereas the quick motion of the rod 5 results in staying the movable body 10 by the slide thereof on the rod 5. However, the present invention is not limited to such condition. That is, the movable body 10 can be moved relative to the rod 5 when the sliding lengths of the movable body 10 are different from each other between the occasion of the slow motion of the rod 5 and the occasion of the quick motion thereof even if the slow motion of the rod 5 results in slightly sliding the movable body 10 relative to the rod 5 and the quick motion of the rod 5 results in not staying but sliding the movable body 10 relative to the rod 5.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving device comprising:
   an electromechanical transducer that extends and contracts upon application of voltage thereto,
   a support member that slidably supports a movable body and is displaced together with the electromechanical transducer to which the support member is connected, and a drive circuit that applies the voltage to the electromechanical transducer, wherein
applied to the electromechanical transducer by the drive circuit is the voltage which increases or decreases from a first voltage to a last voltage in a stepped manner and in which at least three values sequentially circulates, the movable body is relatively moved with respect to the support member by making a difference between an extension velocity and a contraction velocity when the electromechanical transducer extends and contracts upon application of the voltage thereto, and a period of time for which the first voltage is applied is changeable.

2. A driving device as claimed in claim 1, wherein the driving circuit smoothly changes the period of time for which the first voltage is applied so as to gradually increase the velocity of the movable body on occasion of start of the movable body.

3. A driving device as claimed in claim 2, wherein ta/T (herein, T represents a resonance period of a system composed of the electromechanical transducer and the support member and ta represents the period of time for which the first voltage is applied) is increased between 0.5 and 1.0 or decreased between 1.5 and 1.0 when the movable body is started.

4. A driving device as claimed in claim 1, wherein the driving circuit smoothly changes the period of time for which the first voltage is applied so as to gradually decrease the velocity on occasion of stop of the movable body.

5. A driving device as claimed in claim 1, wherein ta/T (herein, T represents a resonance period of a system composed of the electromechanical transducer and the support member and ta represents the period of time for which the first voltage is applied) is decreased between 1.0 and 0.5 or increased between 1.0 and 1.5 when the movable body is stopped.

6. A driving device as claimed in claim 1, wherein the voltage applied to the electromechanical transducer by the drive circuit sequentially circulates among three values.

7. A driving device as claimed in claim 1, wherein the voltage applied to the electromechanical transducer by the drive circuit sequentially circulates among four values.

8. A driving device as claimed in claim 1, wherein the driving circuit includes a H-bridge circuit having four switching elements and a control circuit outputting signals for turning on or off to each of the switching elements, and the driving circuit changes the period of time for which the first voltage is applied by control in timing when the control circuit outputs the signals to each of the switching elements.

9. A driving device as claimed in claim 1, wherein the support member is fixed to one end in extension and contraction directions of the electromechanical transducer.

10. A driving device comprising:
an electromechanical transducer that extends and contracts upon application of voltage thereto,
a support member that is in the form of a rod, that one end of which is fixed to one end in extension and contraction directions of the electromechanical transducer and that slidably supports a movable body,
a biasing member that biases the movable body toward the support member, and
a drive circuit that includes an H-bridge circuit which has four switching elements and which applies the voltage to the electromechanical transducer and a control circuit which controls the switching elements so as to apply from the H-bridge circuit to the electromechanical transducer the voltage which increases or decreases from a first voltage to a last voltage in a stepped manner and in which at least three values sequentially circulates, wherein
the movable body is relatively moved with respect to the support member while repeating a state where the movable body is moved together with the support member through a frictional force to the support member and a state where the movable body slides along the support member through an action of a force which overcomes the frictional force to the support member by making a difference between an extension velocity and a contraction velocity when the electromechanical transducer extends and contracts upon application of the voltage thereto, and
a period of time for which the first voltage is applied is smoothly changed when the movable body is started and/or stopped.

11. A driving device as claimed in claim 10, wherein the driving circuit smoothly changes the period of time for which the first voltage is applied so as to gradually increase the velocity of the movable body on occasion of start of the movable body.

12. A driving device as claimed in claim 10, wherein the driving circuit smoothly changes the period of time for which the first voltage is applied so as to gradually decrease the velocity on occasion of stop of the movable body.

13. A driving device as claimed in claim 1, wherein the movable body makes a difference in sliding length along the support member between an occasion of extension of the electromechanical transducer and an occasion of contraction thereof by making a difference between an extension velocity and a contraction velocity when the electromechanical transducer extends and contracts upon application of the voltage thereto, and the movable body is thereby moved relatively with respect to the support member.

14. A driving device as claimed in claim 1, wherein the movable body repeats a state where the movable body is moved together with the support member through a frictional force to the support member and a state where the movable body slides along the support member through an action of a force which overcomes the frictional force to the support member by making a difference between an extension velocity and a contraction velocity when the electromechanical transducer extends and contracts upon application of the voltage thereto, and the movable body is thereby moved relatively with respect to the support member.

15. A driving method of a movable body in a driving device having:
an electromechanical transducer that extends and contracts upon application of voltage thereto,
a support member that is in the form of a rod, that one end of which is fixed to one end in extension and contraction directions of the electromechanical transducer and that slidably supports a movable body,
a biasing member that biases the movable body toward the support member, and
a drive circuit that includes an H-bridge circuit which has four switching elements and which applies the voltage to the electromechanical transducer and a control circuit which controls the switching elements,
the driving method comprising the steps of:
applying from the driving circuit to the electromechanical transducer the voltage which increases or decreases from a first voltage to a last voltage in a stepped manner and in which at least three values sequentially circulates, repeating a state where the movable body is moved together with the support member through a frictional force to the support member and a state where the movable body slides along the support member through an action of a force which overcomes the frictional force to the support member by making a difference between an extension velocity and a contraction velocity when the electromechanical transducer extends and contracts upon application of the voltage thereto, and changing smoothly a period of time for which the first voltage on occasion of the start and/or the stop of the movable body.

* * * * *